United States Patent [19]

Rumpf et al.

[11] Patent Number: 5,495,994

[45] Date of Patent: Mar. 5, 1996

[54] INERTIA SENSITIVE SEAT BELT RETRACTOR

[75] Inventors: Robert J. Rumpf, Grosse Pointe; Lawrence J. Verellen, Washington; Gary M. Ray, Royal Oak, all of Mich.

[73] Assignee: TRW Vehicle Safety Systems Inc., Lyndhurst, Ohio

[21] Appl. No.: 301,708

[22] Filed: Sep. 7, 1994

[51] Int. Cl.$^6$ .................................................. B60R 22/40
[52] U.S. Cl. .................................. 242/384.4; 242/384.6; 297/478
[58] Field of Search ........................... 242/384.4, 384.5, 242/384.6, 384.2; 280/806; 297/478

[56] References Cited

U.S. PATENT DOCUMENTS

| | | | |
|---|---|---|---|
| 3,901,461 | 8/1975 | Stephenson et al. | 242/384.4 |
| 3,938,754 | 2/1976 | Stephenson et al. | |
| 3,938,755 | 2/1976 | Stephenson et al. | |
| 3,995,788 | 12/1976 | Stephenson et al. | |
| 4,331,304 | 5/1982 | Matsuoka et al. | 242/384.2 |
| 4,556,177 | 12/1985 | Kuwakado et al. | |
| 5,014,926 | 5/1991 | Rumpf et al. | |
| 5,145,123 | 9/1992 | Kotikovsky. | |
| 5,289,986 | 3/1994 | Hoshihara. | |

FOREIGN PATENT DOCUMENTS 2645456  4/1978  Germany .............................. 242/384.4

*Primary Examiner*—John M. Jillions
*Attorney, Agent, or Firm*—Tarolli, Sundheim & Covell

[57] ABSTRACT

A seat belt retractor (10) includes a vehicle deceleration sensing assembly (40) which is operable at a plurality of different inclined orientations to block withdrawal of belt webbing (32) from a spool (110). The spool (110) is rotatable about a first axis (62) of the retractor. The sensing assembly (40) includes a first inertia member (222) supported for movement on a second inertia member (224). The second inertia member is supported for pivotal movement about an axis (260) which extends parallel to an adjustment axis (30) of a vehicle seat back (22) in which the retractor (10) is mounted. The first inertia member (222) is movable to move a pawl (180, 200) into engagement with a ratchet (114–116, 130) rotatable about the first axis (62) to block rotation of the spool (110) in a belt withdrawal direction (124).

5 Claims, 12 Drawing Sheets

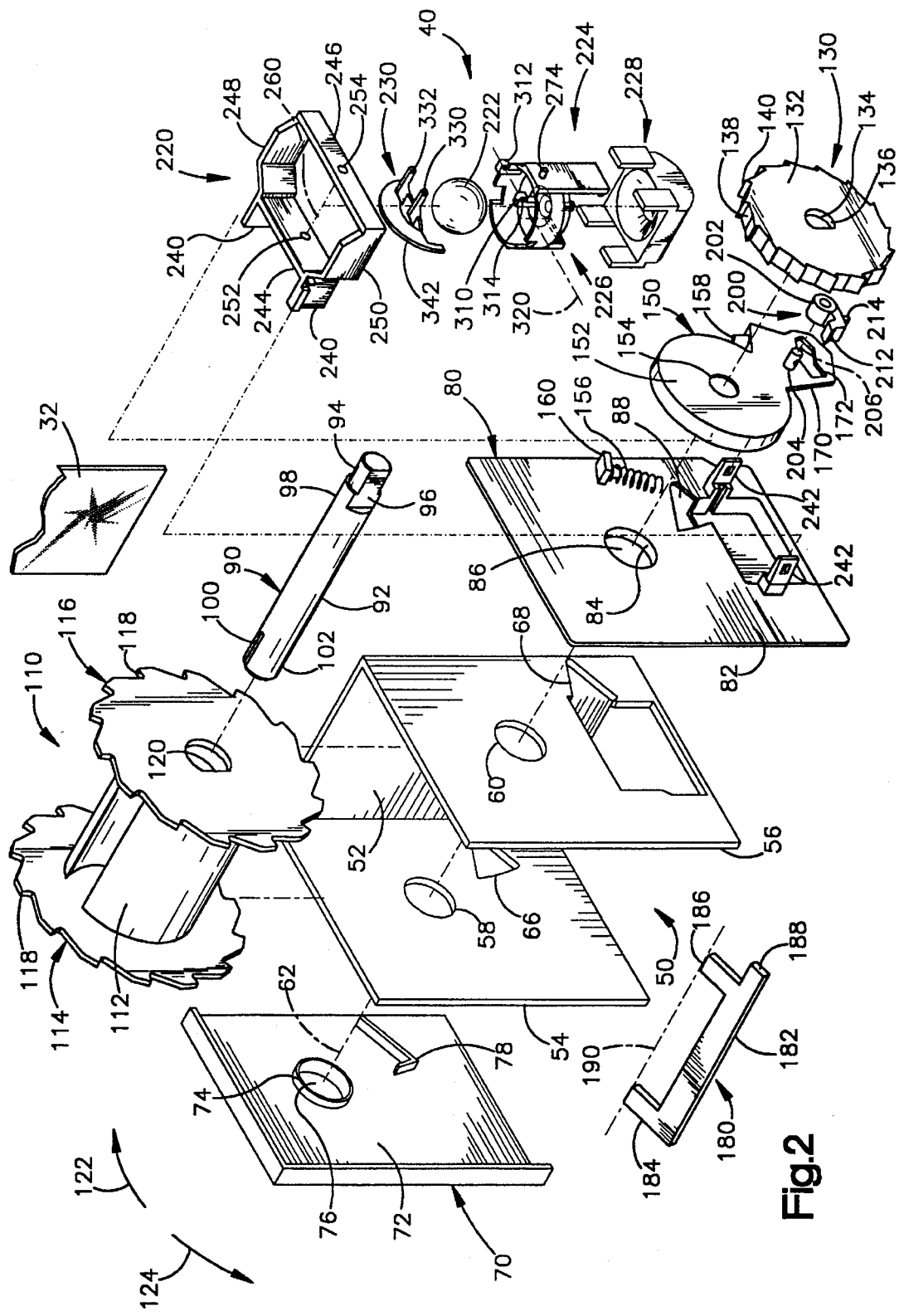

INERTIA SENSITIVE SEAT BELT RETRACTOR

BACKGROUND OF THE INVENTION

1. Technical Field

The present invention relates to a vehicle seat belt retractor, and particularly to a retractor in which withdrawal of belt webbing is blocked in response to sudden vehicle deceleration such as occurs in a vehicle collision.

2. Description of the Prior Art

A typical seat belt system used to restrain a vehicle occupant includes a length of belt webbing wound on a spool of a seat belt retractor. The belt webbing is extensible about a vehicle occupant to restrain the occupant. In the event of sudden deceleration such as occurs in a vehicle collision, a vehicle deceleration sensing assembly in the retractor is actuated to block withdrawal of the belt webbing from the retractor.

A typical vehicle deceleration sensing assembly includes an inertia mass which, in the event of sudden vehicle deceleration, moves relative to other parts of the retractor. The movement of the inertia mass actuates a locking mechanism to block rotation of the spool on which the seat belt webbing is wound.

It is desirable that a vehicle deceleration sensing assembly be operable when the retractor is in a plurality of different inclined orientations. Thus, if the retractor is, for example, mounted in a reclinable vehicle seat back, the sensing assembly should preferably be operable when the seat back is reclined at different positions. U.S. Pat. No. 5,289,986 discloses one such type of vehicle deceleration sensing assembly.

SUMMARY OF THE INVENTION

The present invention is a seat belt webbing retractor for use in a vehicle in a selected one of a plurality of different inclined orientations. The retractor includes a frame, a spool on which seat belt webbing is wound, and means for supporting the spool on the frame for rotation about a first axis in a belt retraction direction and in an opposite belt withdrawal direction. The retractor includes means for blocking rotation of the spool in the belt withdrawal direction in response to vehicle deceleration above a predetermined deceleration. The blocking means comprises a ratchet rotatable with the spool about the first axis, a pawl movable from a disengaged position into an engaged position in engagement with the ratchet, and means for supporting the pawl for movement between the disengaged position and the engaged position.

A first inertia member is movable from an unactuated position to an actuated position in response to vehicle deceleration above a predetermined deceleration. The retractor includes support means for supporting the first inertia member in the unactuated position when the retractor is in any one of a plurality of different inclined orientations. The support means and the first inertia member have the same predetermined orientation at each of the plurality of different inclined orientations of the retractor. The first inertia member is movable relative to the support means from the unactuated position to the actuated position.

The support means comprises a second inertia member which is supported on the frame for pivotal movement relative to the frame to maintain the predetermined orientation of the first inertia member and of the support means at the plurality of different inclined orientations of the retractor. The retractor includes sensor means for moving the pawl from the disengaged position to the engaged position in response to movement of the first inertia member relative to the second inertia member from the unactuated position to the actuated position.

BRIEF DESCRIPTION OF THE DRAWINGS

Further features of the present invention will become apparent to those skilled in the art to which the present invention relates from reading the following specification with reference to the accompanying drawings, in which:

FIG. 2 is an exploded perspective view of the retractor of FIG. 1;

DESCRIPTION OF PREFERRED EMBODIMENTS OF THE INVENTION

Figure 1:
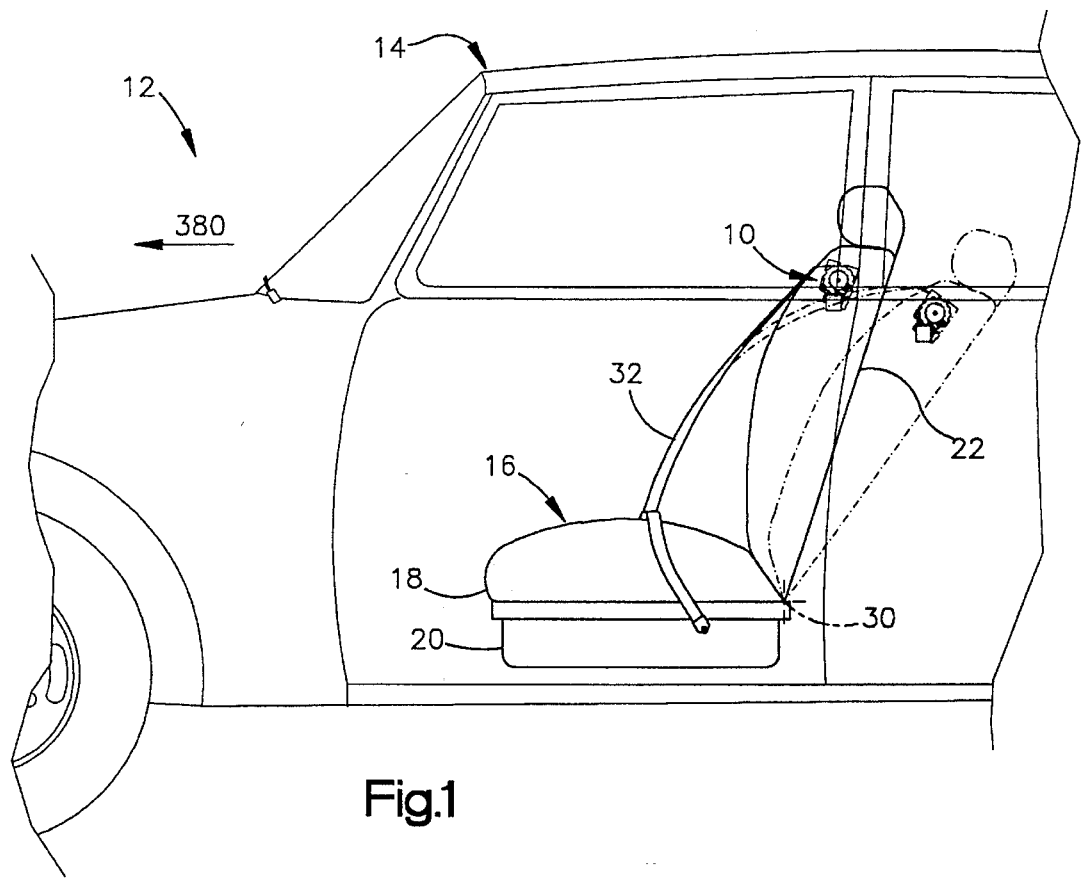
FIG. 1 is a schematic side elevational view illustrating a portion of a vehicle having a seat with a reclining seat back and a seat belt retractor mounted on the seat back and having a vehicle deceleration sensing assembly constructed in accordance with the present invention.

The present invention relates to a vehicle seat belt retractor and particularly to a retractor in which withdrawal of belt webbing is blocked in response to sudden vehicle deceleration such as occurs in a vehicle collision. The present invention is applicable to various retractor constructions. As representative of the present invention, FIG. 1 illustrates a seat belt retractor 10.

The retractor 10 is mounted in a vehicle 12 which includes a body 14. A seat 16 of the vehicle 12 includes a seat bottom cushion 18 mounted on a base 20. A seat back 22 is connected with the seat bottom cushion 18 and the seat base 20 for pivotal movement about a seat back adjustment axis 30 relative to the seat bottom cushion and to the base.

The retractor 10 is mounted in the seat back 22 in a suitable manner (not shown) such as by connection to a frame member of the seat back. A length of belt webbing 32 extends from the retractor 10 through a slot 34 (FIG. 1A) in the seat back 22. The belt webbing 32 is extensible around an occupant of the seat 16, in a known manner, to restrain the occupant in the event of sudden vehicle deceleration such as occurs in a vehicle collision.

Figures 1A, 1B:
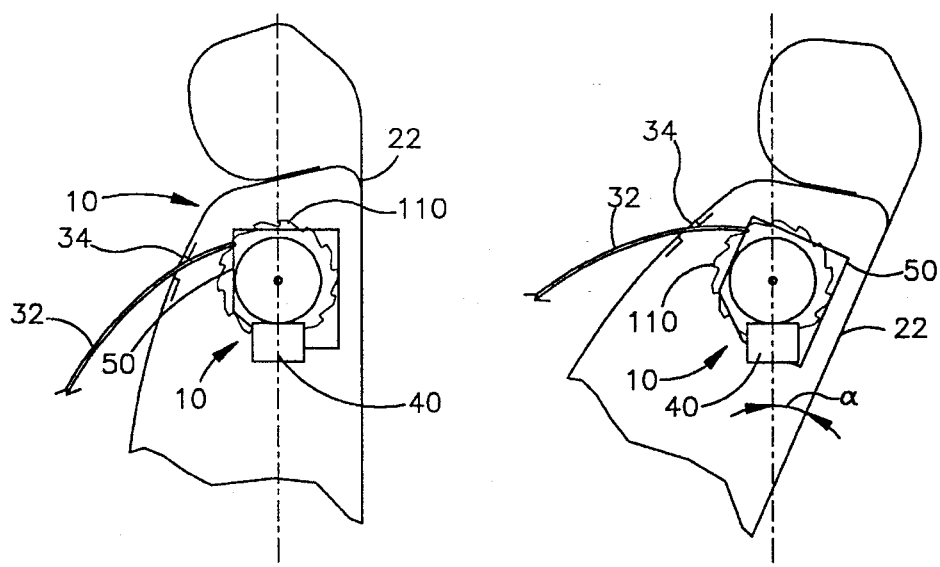
FIG. 1A is an enlarged view of a portion of the seat back of FIG. 1 shown in a vertical position.
FIG. 1B is a view similar to FIG. 1A showing the seat back reclined at an angle.

As illustrated in FIGS. 1A and 1B, and as will be described below in more detail, the retractor 10 includes a vehicle deceleration sensing assembly 40. When the retractor 10 is in any one of a plurality of different inclined orientations, such as the vertical orientation shown in FIG. 1A and the reclined orientation shown in FIG. 1B (inclined at an angle α), the sensing assembly 40 is actuatable to block withdrawal of belt webbing 32 from the retractor 10 in response to sudden vehicle deceleration such as occurs in a vehicle collision.

The retractor 10 (FIG. 2) includes a frame 50 which is fixed to the vehicle seat back 22 in a manner not shown. The frame 50 is a single piece of sheet metal stamped and formed to a U-shaped configuration as seen in FIG. 2. The frame 50 includes a back wall 52 and spaced parallel side walls 54 and 56 which extend generally perpendicular to the back wall.

A circular opening 58 is formed in one frame side wall 54. A circular opening 60 is formed in the other frame side wall 56. The centers of the circular openings 58 and 60 are disposed on a spool axis 62 of the retractor 10. The spool axis 62 extends between the frame side walls 54 and 56 in a direction parallel to the frame back wall 52. A wedge-shaped main lock pawl opening 66 in the frame side wall 54 is aligned with a wedge-shaped main lock pawl opening 68 in the frame side wall 56.

A plastic end plate 70 is fixed to the frame side wall 54. A planar wall portion 72 of the end plate 70 is disposed in abutting engagement with the frame side wall 54. An annular boss 74 on the end plate 70 is received in the circular opening 58 in the frame side wall 54. The boss 74 defines a circular opening 76 which extends axially through the end plate 70. A V-shaped projection 78 on the wall portion 72 of the end plate 70 is received in the main lock pawl opening 66 in the frame side wall 54.

A plastic bearing plate 80 is fixed to the other frame side wall 56. A planar wall portion 82 of the bearing plate 80 is disposed in abutting engagement with the frame side wall 56. An annular boss 84 on the bearing plate 80 is received in the circular opening 60 in the frame side wall 56. The boss 84 defines a circular opening 86 which extends axially through the bearing plate 80. A main lock pawl opening 88 in the bearing plate 80 is aligned with the main lock pawl opening 68 in the frame side wall 56.

The retractor 10 includes a cylindrical shaft 90 having a full diameter portion 92 and a reduced diameter end portion 94. A flat 96 extends axially along the reduced diameter end portion 94 and along a small portion 98 of the full diameter portion 92 of the shaft 90. The flat 96 gives the shaft end portion 94 a D-shaped cross-sectional configuration as seen in FIG. 2. An axially-extending slot 100 is formed in the opposite end portion 102 of the shaft 90.

A spool 110 includes a sleeve 112 and a pair of spool locking ratchet wheels 114 and 116 fixed to opposite axial ends of the sleeve. Each spool locking ratchet wheel 114 and 116 has on its perimeter a plurality of circumferentially spaced ratchet teeth 118. The full diameter portion 92 of the shaft 90 extends through a circular opening (not shown) in the spool locking ratchet wheel 114. The D-shaped portion 98 of the shaft 90 is received in a D-shaped opening 120 in the other spool locking ratchet wheel 116. The spool 110 is thus fixed for rotation with the shaft 90. The seat belt webbing 32 is wound on the sleeve 112 of the spool 110 in a manner not shown.

The slotted end portion 102 of the shaft 90 extends through the opening 58 in the frame side wall 54 and is supported for rotation on the boss 74 of the end plate 70. The opposite end of the shaft 90 extends through the opening 60 in the frame side wall 56 and is supported for rotation on the boss 84 of the bearing plate 80. The spool 110 is rotatable about the spool axis 62 relative to the frame 50 in a belt retraction direction 122 and in an opposite belt withdrawal direction 124. A rewind spring mechanism (not shown) is connected with the shaft 90 through the slot 100 in the shaft end portion 102. The rewind spring mechanism biases the spool 110 for rotation in the belt retraction direction 122.

The retractor 10 includes a carrier or pilot ratchet 130. The pilot ratchet 130 has a radially extending circular disk portion 132. An annular boss 134 on the pilot ratchet 130 projects axially from the disk portion 132 in a direction toward the spool 110. The boss 134 has a cylindrical outer periphery (not shown) and a D-shaped central opening 136. The D-shaped central opening 136 receives the D-shaped end portion 94 of the shaft 90. The pilot ratchet 130 is thus fixed for rotation with the spool 110. A cylindrical wall 138 of the pilot ratchet 130 extends axially from the disk portion 132 in a direction toward from the spool 110. A plurality of ratchet teeth 140 are formed in a circular array on the outer periphery of the wall 138 of the pilot ratchet 130.

A main lock pawl actuator 150 is disposed intermediate the bearing plate 80 and the pilot ratchet 130. The main lock pawl actuator 150 has a radially extending circular disk portion 152 with a circular opening 154. The boss 134 of the pilot ratchet 130 extends through the circular opening 154 and supports the actuator 150 for limited rotation about the spool axis 62. The actuator 150 is rotatable about the spool axis 62 between a first or unactuated position as viewed in FIGS. 3A and 3B and a second or actuated position as viewed in FIG. 3C. A return spring 156 acting between a spring support 158 on the actuator 150 and a spring support 160 on the bearing plate 80 biases the actuator into the first or unactuated position as viewed in FIGS. 3A and 3B. The actuator 150 also has a radially extending cam portion 170. A V-shaped cam slot 172 extends through the cam portion 170 of the actuator 150.

A main lock pawl 180 is disposed adjacent to the spool locking ratchet wheels 114 and 116. The main lock pawl 180 is preferably made from metal and includes a locking portion 182 which extends between a pair of arms 184 and 186. The arm 184 is supported on the plastic projection 78 in the opening 66 in the frame side wall 54. The plastic projection 78 minimizes rattling noises which might be caused by metal-to-metal contact between the main lock pawl 180 and the frame side wall 54. The other arm 186 of the main lock pawl 180 is supported in the opening 88 in the bearing plate 80. The main lock pawl 180 is thus supported for pivotal movement about a main lock pawl axis 190 which is spaced from and extends parallel to the spool axis 62. A finger portion 188 of the main lock pawl 180 extends from the support arm 186 and is received in the cam slot 172 in the main lock pawl actuator 150.

An intermediate lever or pilot pawl 200 has a first end portion 202 which encircles a pin 204 on the actuator cam portion 170. The pilot pawl 200 is supported on the pin 204 for pivotal movement about a pilot pawl axis 206 relative to the actuator 150. The pilot pawl axis 206 is spaced from and extends parallel to both the spool axis 62 and the main lock pawl axis 190.

A second end portion 210 of the pilot pawl 200 projects forward from the pin 204. An upper surface of the second end portion 210 defines a tooth 212 which projects upward in a direction toward the ratchet teeth 140 on the pilot ratchet 130. A lower surface of the second end portion 210 of the pilot pawl 200 is formed as a downwardly projecting axially extending rib 214.

The vehicle deceleration sensing assembly 40 (FIGS. 2, 3A, and 4) includes generally a hanger 220, a first inertia member 222, a second inertia member 224 which includes a plastic shell 226 and a metal weight 228, and a sensor lever 230. The hanger 220 is a plastic member which is connected to the bearing plate 80 and which supports the other components of the vehicle deceleration sensing assembly 40. A pair of support tabs 240 on the hanger 220 are received in corresponding support arms 242 on the bearing plate 80 which project axially away from the spool 110. The engagement of the tabs 240 of the hanger 220 with the support arms 242 of the bearing plate 80 secures the hanger 220 to the bearing plate 80 and thus to the frame 50.

The hanger 220 has an open rectangular configuration and includes parallel inner and outer cross arms 244 and 246 which are joined at their ends by a pair of side arms 248 and 250. An opening 252 in the inner cross arm 244 and an opening 254 in the outer cross arm 246 define between them a gimbal axis 260. The gimbal axis 260 extends parallel to the seat back adjustment axis 30. The gimbal axis 260 preferably, but not necessarily, also extends parallel to the spool axis 62.

Figure 3A:
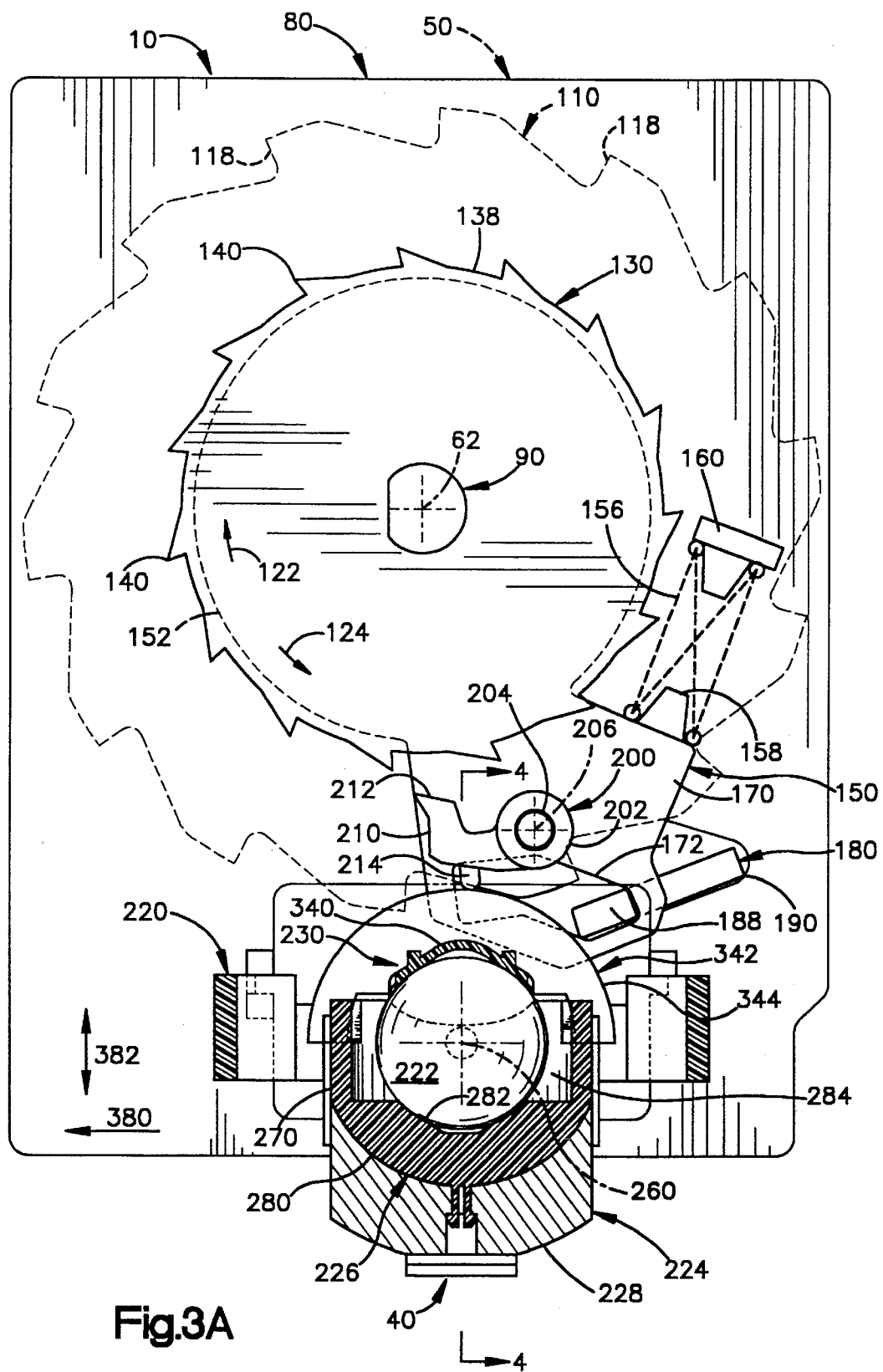
FIG. 3A is a schematic side elevational view of the retractor of FIG. 1 in a first inclined orientation with parts removed and parts in section and with the sensing assembly in an unactuated condition.
Figure 4:
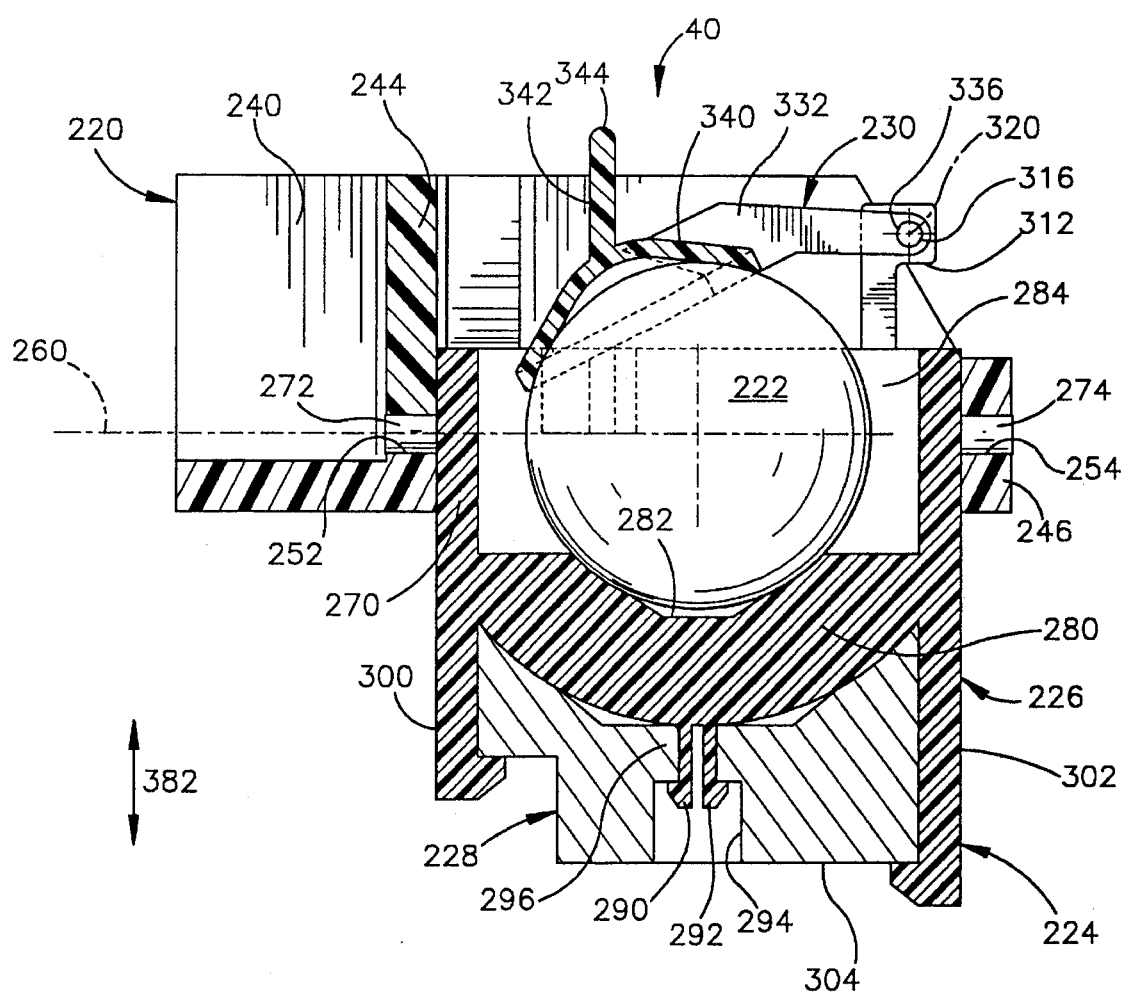
FIG. 4 is a sectional view taken along line 4—4 of FIG. 3A with parts removed.

The plastic shell 226 has a cylindrical wall portion 270 (FIG. 3A). Two pins 272 and 274 project outwardly from the cylindrical wall portion 270 and are received in the openings 252 and 254 of the hanger 220. The pins 272 and 274 support the shell 226 on the hanger 220 for pivotal movement about the gimbal axis 260 relative to the hanger 220.

A bottom wall portion 280 of the shell 226 has a generally frustoconical upwardly facing ramp surface 282. The ramp surface 282 and the cylindrical wall portion 270 of the shell 226 partially define a cavity 284 in the shell. The first inertia member 222, which is preferably a spherical steel ball, is disposed on the ramp surface 282 and in the cavity 284. The center of mass of the first inertia member 222 is disposed above the ramp surface 282.

Two clip arms 290 and 292 (FIG. 4) project downward from the bottom wall portion 280 of the shell 226 and extend through a central opening 294 in the metal weight 228. The clip arms 290 and 292 engage under a center portion 296 of the metal weight 228. Another pair of clip arms 300 and 302 extend downward along the outside of the metal weight 228 and engage under a lower surface 304 of the metal weight. The clip arms 290, 292, 300 and 302 support the metal weight 228 and connect the metal weight for movement with the shell 226. The center of mass of the second inertia member 224, that is, of the combined shell 226 and weight 228, is disposed below the gimbal axis 260 and below the ramp surface 282.

A pair of sensor lever support posts 310 and 312 (FIGS. 2 and 4) project upward from the cylindrical wall portion 270 of the shell 226. A pair of openings 314 and 316 on the sensor lever support posts 310 and 312 define a sensor lever axis 320. The sensor lever axis 320 extends transverse to the gimbal axis 260.

The sensor lever 230 is made from plastic and has two parallel arms 330 and 332. A pivot pin 336 on the sensor lever arm 332 is received in the opening 316 in the sensor lever support post 312. A pivot pin (not shown) on the sensor lever arm 330 is received in the opening 314 on the sensor lever support post 310. The sensor lever 230 is thus supported on the shell 226 for pivotal movement about the sensor lever axis 320 relative to the shell 226.

A cap portion 340 of the sensor lever 230 is disposed above and rests upon the first inertia member 222. An arch portion 342 of the sensor lever 230 projects upward from the cap portion 340 in a direction away from the first inertia member 222. The arch portion 342 has an arcuate outer surface 344. The surface 344 is configured as an arc of a circle which is centered on the gimbal axis 260 when the sensing assembly 40 is in the unactuated condition illustrated in FIGS. 3A and 3B. The arch portion 342 of the outer surface 344 of the sensor lever 230 engages the underside of the downwardly projecting rib 214 on the pilot pawl 200.

The vehicle seat back 22 (FIG. 1) can be reclined relative to the seat bottom cushion 18, about the seat back adjustment axis 30, to place the retractor 50 in a plurality of different inclined orientations. FIG. 3A shows the retractor 10 in a first one of the plurality of inclined orientations. The parts of the retractor 10 are illustrated in FIG. 3A in a condition with the vehicle 12 moving at a steady speed in a forward direction as indicated by the arrow 380. The first inertia member 222 and the second inertia member 224 are in a predetermined orientation relative to the other parts of the retractor 10. In this predetermined orientation, the center of mass of the first inertia member 222 is disposed vertically above the center of mass of the second inertia member 224, as shown by the vertically extending arrow 382. The first inertia member 222 is centered on the ramp surface 282. The tooth portion 212 of the pilot pawl 200 is spaced from the ratchet teeth 140 on the pilot ratchet 130.

Figure 3B:
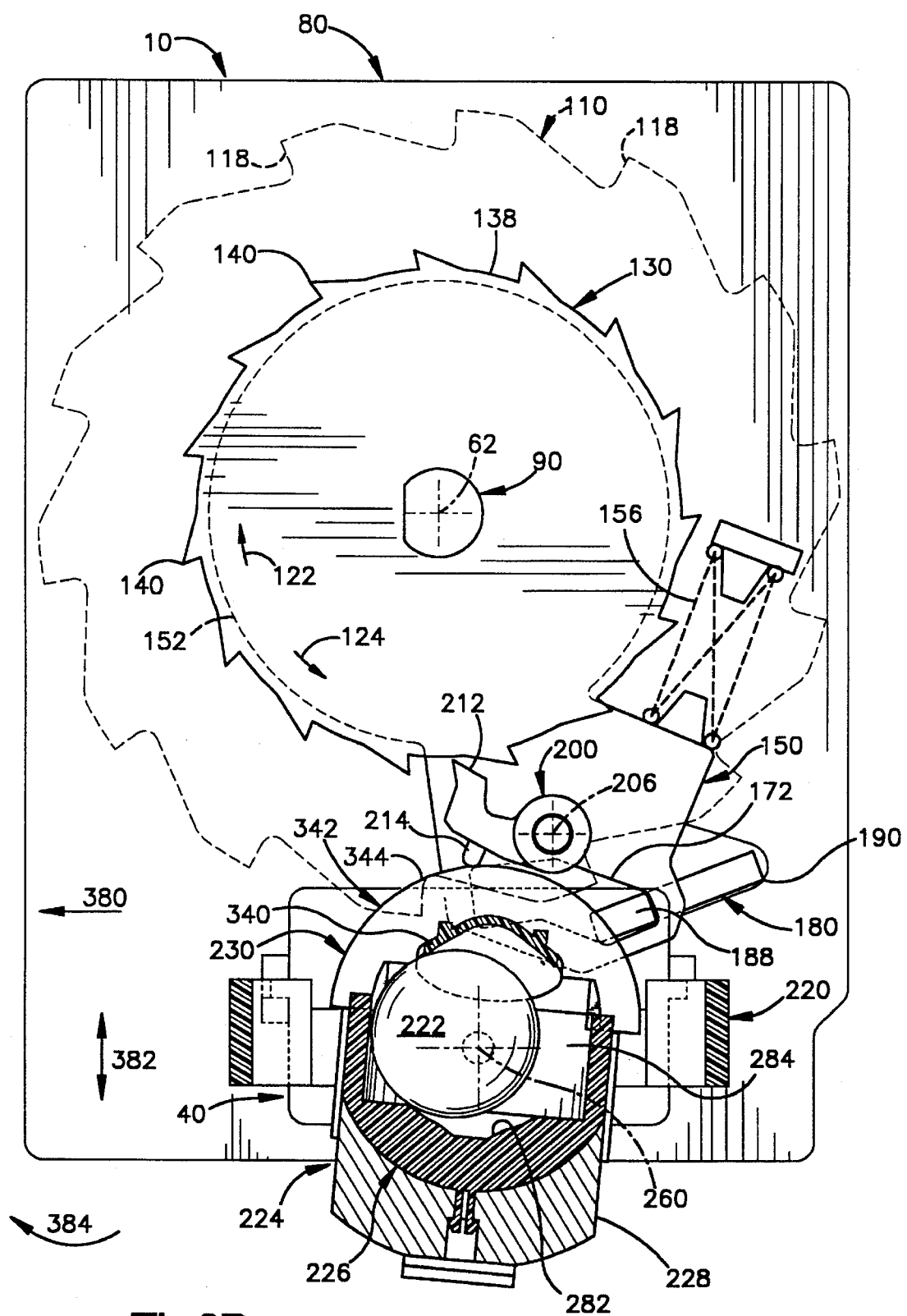
FIG. 3B is a view similar to FIG. 3A but showing the sensing assembly in a partially actuated condition.

In the event of sudden vehicle deceleration such as occurs in a vehicle collision, the parts of the retractor 10 which are supported for pivotal movement about the gimbal axis 260 continue to move forward relative to the other parts of the retractor 10, which decelerate. The parts that continue to move forward include the first and second inertia members 222 and 224. Because the center of mass of the second inertia member 224 is disposed below the gimbal axis 260, the second inertia member swings forward and upward, pivoting about the gimbal axis 260, in a direction as indicated by the arrow 384 (FIG. 3B). At the same time, the first inertia member 222 rolls forward and upward along the ramp surface 282 of the shell 226 of the second inertia member 224.

The first inertia member 222 exerts an upwardly directed force on the sensor lever 230. The sensor lever 230 pivots upward about the sensor lever axis 320. The arch portion 342 of the sensor lever 230 exerts an upwardly directed force on the rib 214 of the pilot pawl 200. The pilot pawl 200 pivots upward about the pilot pawl axis 206. The tooth 212 of the pilot pawl 200 moves into the path of revolution of the pilot ratchet teeth 140.

Should the occupant of the seat 16 move forward relative to the seat back 22 as a result of the sudden vehicle deceleration, the occupant engages the belt webbing 32. Forward movement of the occupant then results in withdrawal of belt webbing from the retractor 10. The retractor spool 110 rotates in the belt withdrawal direction 124. The pilot ratchet 130 is fixed for rotation with the spool 110 and also rotates in the belt withdrawal direction 124.

The pilot pawl tooth 212, which is disposed in the path of revolution of the pilot ratchet teeth 140, is engaged by one of the moving ratchet teeth. The pilot pawl 200 transmits the rotational force of the pilot ratchet 130 into the main lock pawl actuator 150. The main lock pawl actuator 150 rotates about the spool axis 62. The surfaces defining the cam slot 172 in the actuator 150 move relative to the finger portion 188 of the main lock pawl 180. The main lock pawl 180 is cammed upward about the main lock pawl axis 190 from the disengaged position shown in FIGS. 3A and 3B to the engaged position shown in FIG. 3C in engagement with the ratchet teeth 118 on the spool locking ratchet wheels 114 and 116. The engagement of the main lock pawl 180 with the ratchet teeth 118 blocks rotation of the spool 110 in the belt withdrawal direction 124. This blocks further withdrawal of belt webbing 32 from the retractor 10 to restrain the vehicle occupant.

Figure 3C:
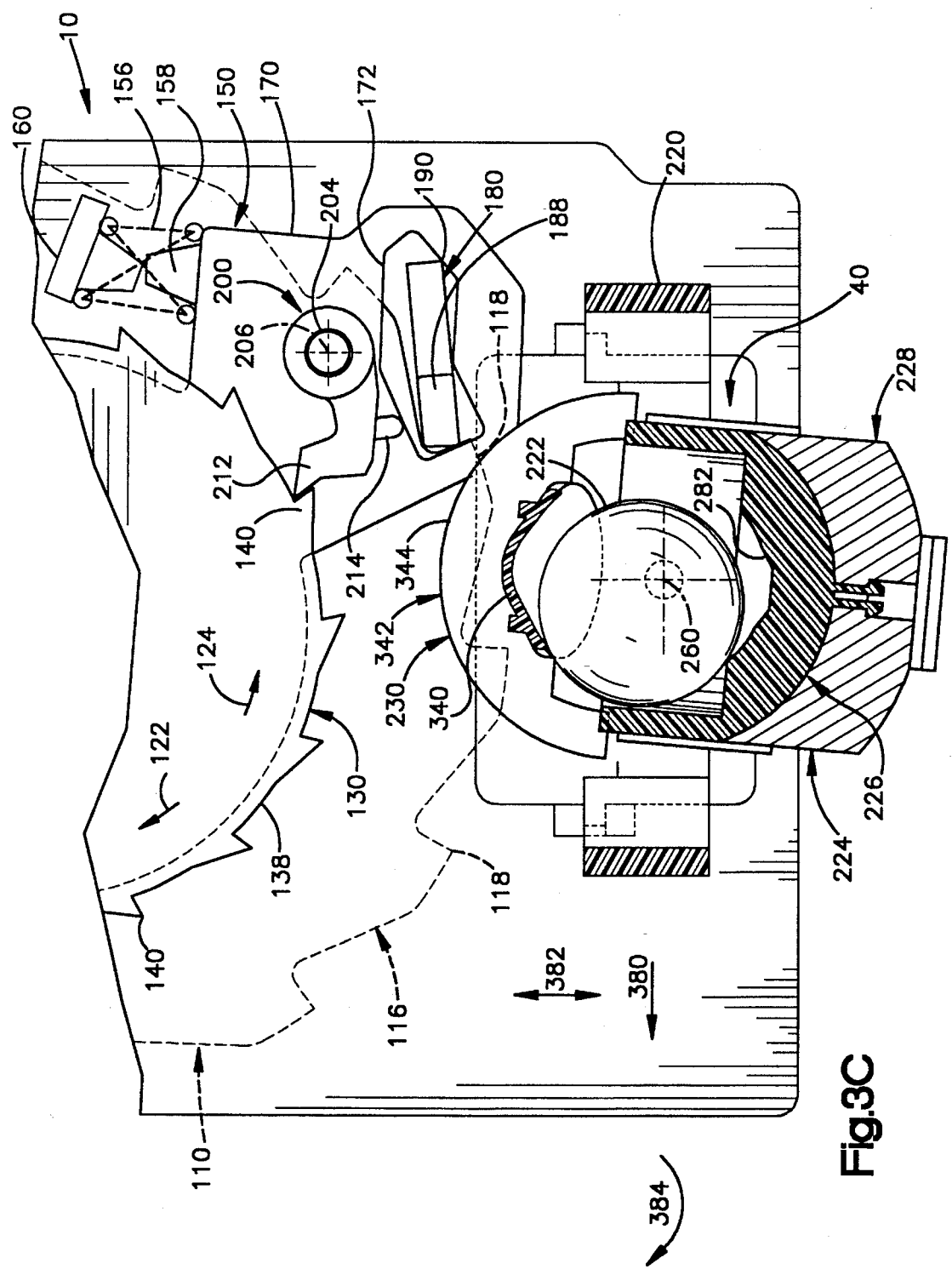
FIG. 3C is a view similar to FIG. 3B showing the sensing assembly in a fully actuated condition.
Figure 5A:
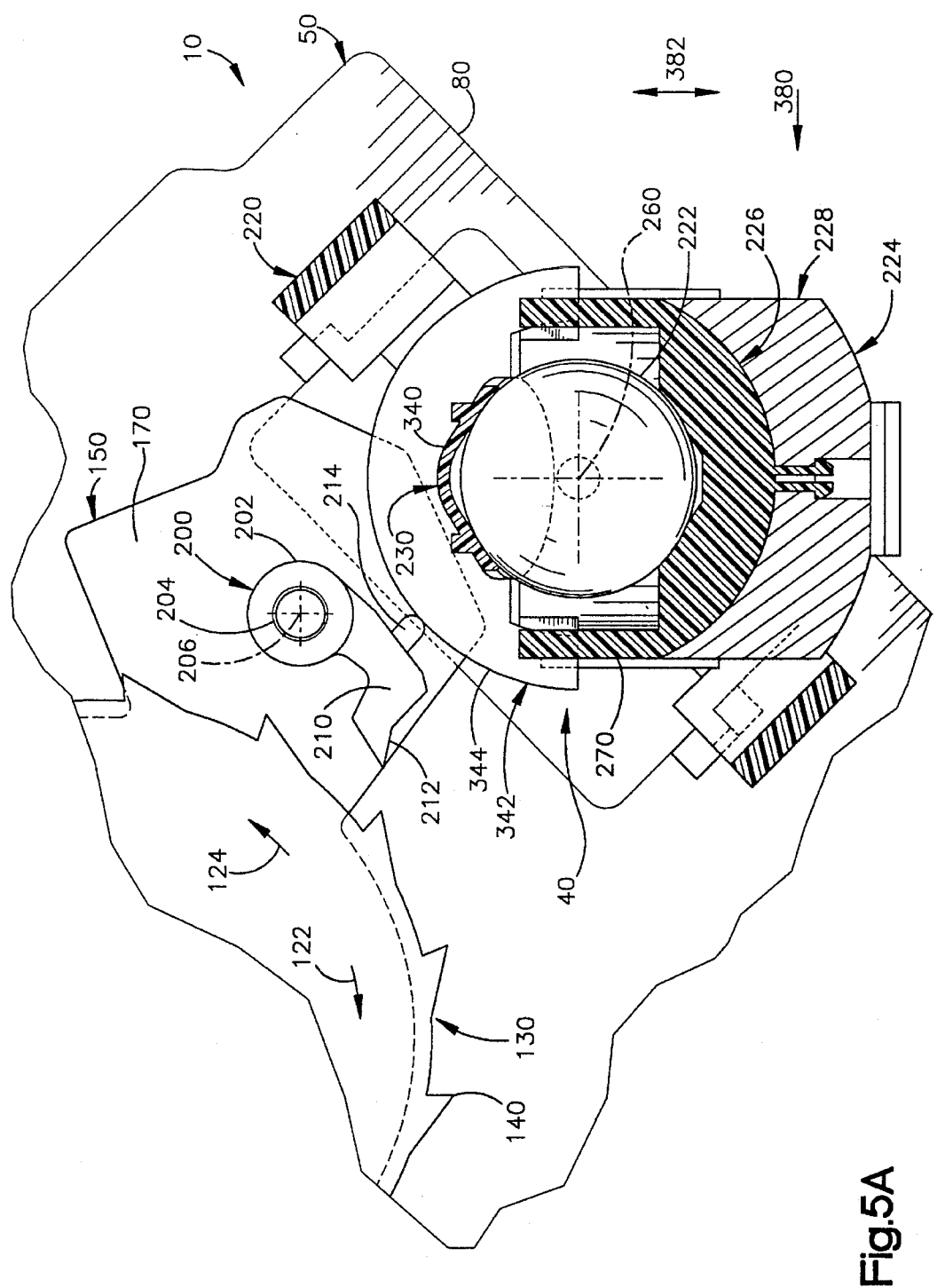
FIG. 5A is a view similar to FIG. 3A showing the retractor in a second inclined orientation.
Figure 5B:
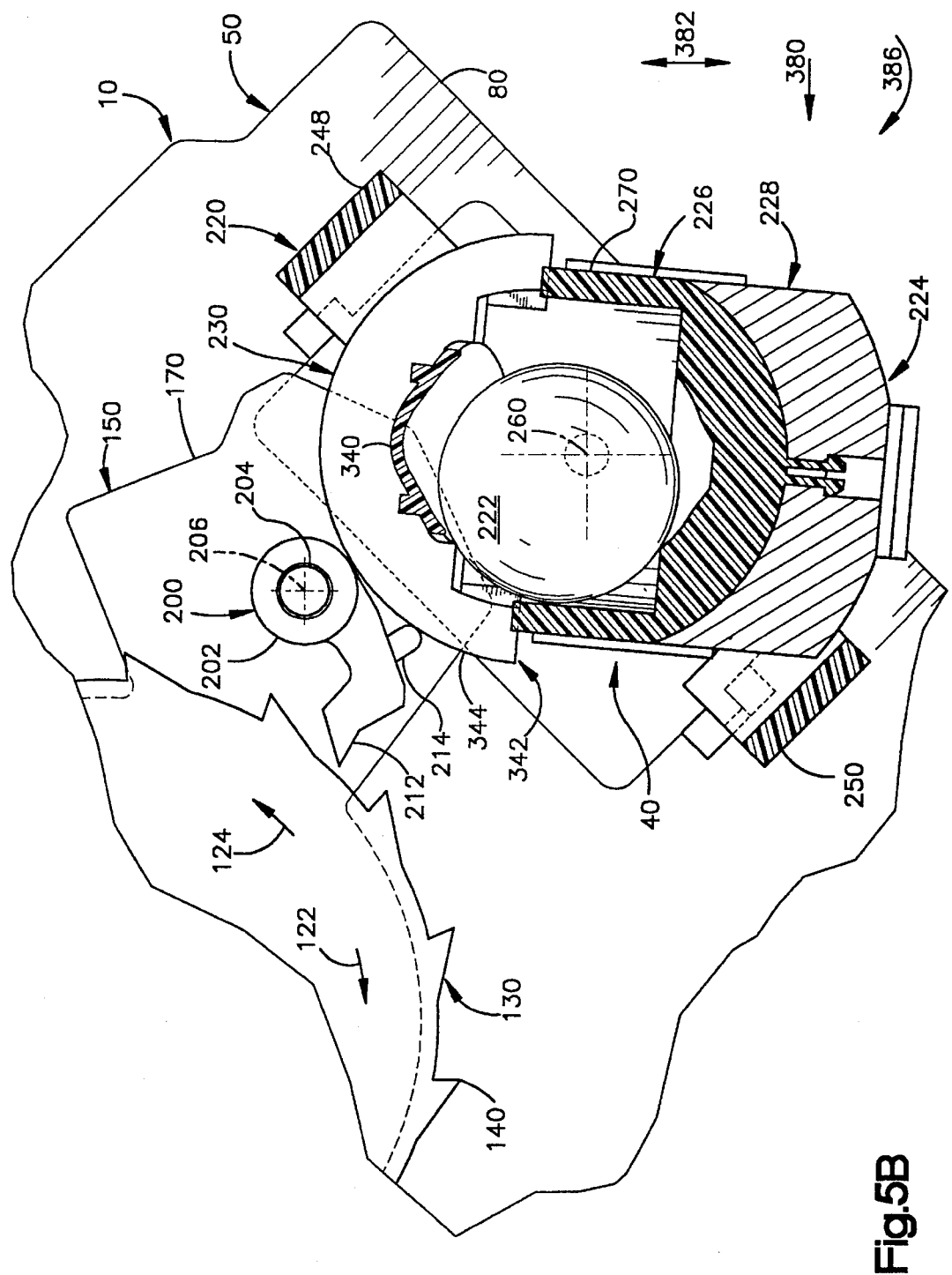
FIG. 5B is a view similar to FIG. 5A showing the sensing assembly in an actuated condition.

FIGS. 5A and 5B illustrate the operation of the vehicle deceleration sensing assembly 40 when the vehicle seat back 22 is pivoted forward about the seat back adjustment axis 30 to a second inclined orientation different from the first inclined orientation illustrated in FIGS. 3A–3C. The retractor frame 50, which is fixed to the seat back 22, moves from the position shown in FIG. 3A to the position shown in FIG. 5A. The retractor 10 is thus disposed in a different inclined orientation, relative to the vertical direction 382, than the orientation shown in FIGS. 3A–3C. The first inertia member 222 and the second inertia member 224, however, are together supported for pivotal movement on the gimbal axis 260. The gimbal axis 260 extends parallel to the seat back adjustment axis 30. As a result, the inertia members 222 and 224 remain in the same orientation in FIG. 5A, relative to the vertical direction 382. Thus, the inertia members 222 and 224 remain in their single predetermined orientation, identical to that shown in FIG. 3A, in which the center of mass of the first inertia member 222 is vertically above the center of mass of the second inertia member 224.

When the retractor 10 in this manner assumes a different inclined orientation, the inertia members 222 and 224, as well as the sensor lever 230, assume a different position relative to the other parts of the retractor 10 which are not supported for swinging movement about the gimbal axis 260. Specifically, the arcuate outer surface 344 on the arch portion 342 of the sensor lever 230 slides along the downwardly projecting rib 214 on the pilot pawl 200 as the retractor 10 moves between the different inclined orientations. Because the surface 344 of the sensor lever 230 is configured as an arc of a circle centered on the gimbal axis 260, the pilot pawl 200 does not move toward or away from the pilot ratchet 130 during movement of the retractor between the different inclined orientations shown in FIGS. 3A and 5A.

When the retractor 10 is in the inclined orientation shown in FIG. 5A, and when the vehicle 12 is moving forward at a steady speed in the direction 380, the inertia members 222 and 224 are moving forward also. In the event of sudden vehicle deceleration such as occurs in a vehicle collision, the inertia members 222 and 224 continue to move forward relative to the other parts of the decelerating retractor 10. The second inertia member 224, which is supported for pivotal movement about the gimbal axis 260, swings forward and upward, in a direction as indicated by the arrow 386 in FIG. 5B. The first inertia member 222, which is supported on the second inertia member 224, rolls upward along the ramp surface 282 on the shell 226. The first inertia member 222 moves more quickly than the second inertia member 224. The first inertia member 222 exerts an upwardly directed force on the cap portion 340 of the sensor lever 230. The sensor lever 230 pivots upward about the sensor lever axis 320.

The sensor lever 230 exerts an upwardly directed force against the rib portion 214 of the pilot pawl 200. The second end portion 210 of the pilot pawl 200 pivots upwardly about the pilot pawl axis 206. The tooth 212 of the pilot pawl 200 moves into the path of the ratchet teeth 140 of the pilot ratchet 130. If the vehicle occupant moves forward and causes withdrawal of belt webbing 32 from the retractor 10, the tooth 212 of the pilot pawl 200 is engaged by one of the teeth 140 of the rotating pilot ratchet 130. The pilot pawl 200 transmits the rotational force of the pilot ratchet 130 into the actuator 150. The actuator 150 rotates about the spool axis 62 and cams the main lock pawl 180 into engagement with the ratchet teeth 118 on the spool 110, in the manner as described above. This engagement blocks rotation of the spool 110 in the belt withdrawal direction 124, thus restraining the vehicle occupant.

Figure 6A:
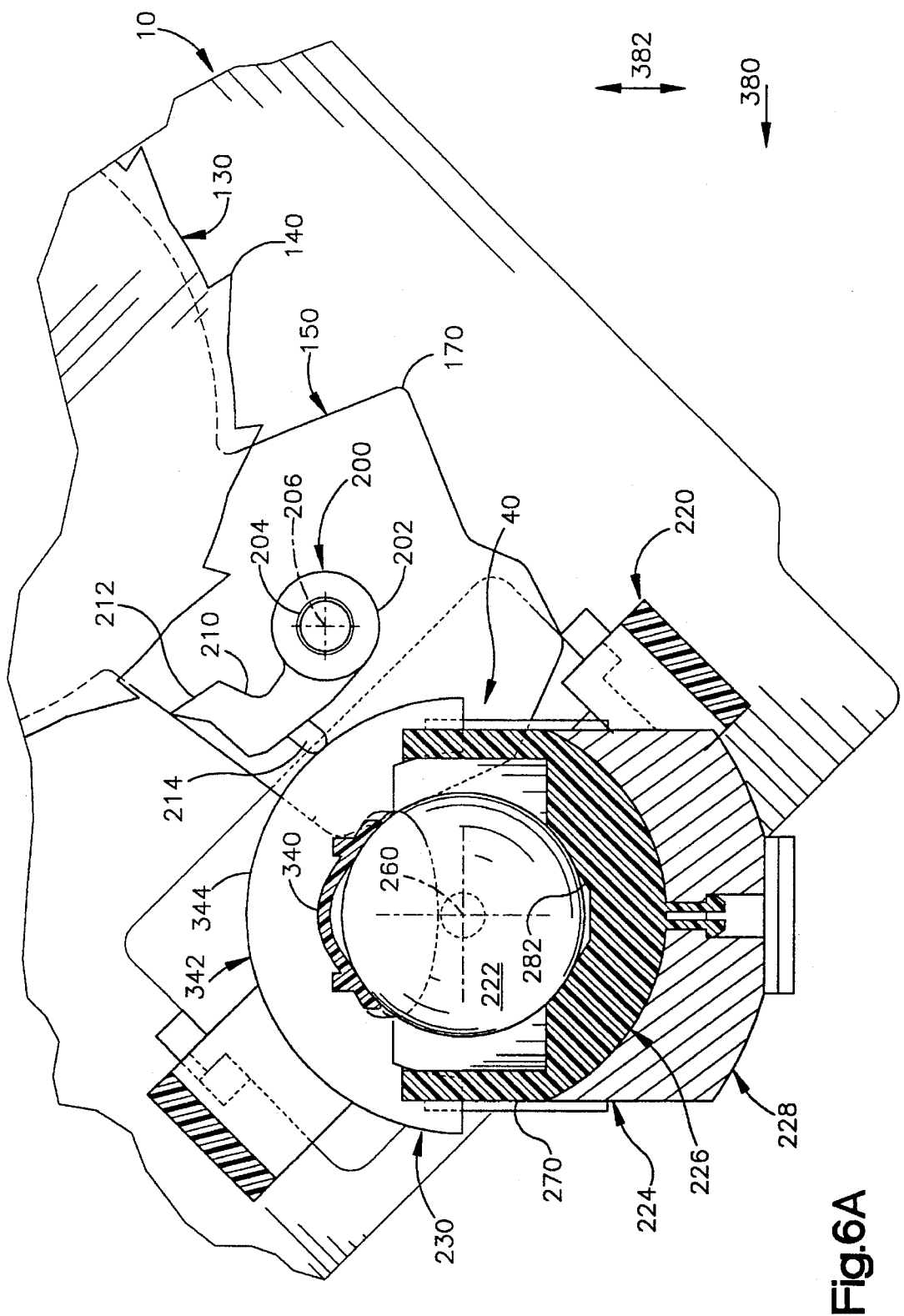
FIG. 6A is a view similar to FIG. 5A showing the retractor in a third inclined orientation.
Figure 6B:
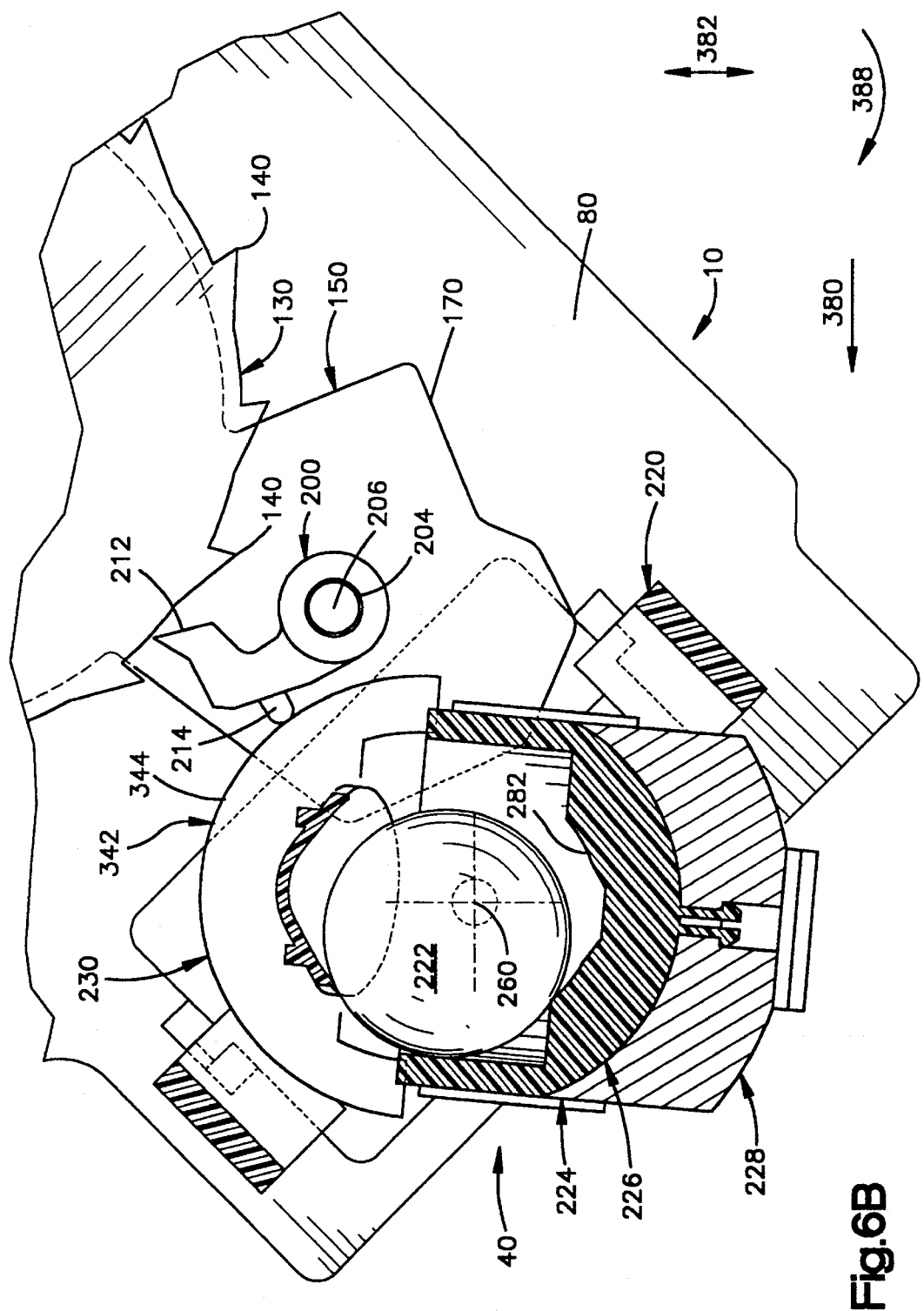
FIG. 6B is a view similar to FIG. 6A showing the sensing assembly in an actuated condition.

FIGS. 6A and 6B illustrate the operation of the sensing assembly 40 when the retractor 10 is in a third inclined orientation different from the first and second orientations and inclined from the vertical in a direction opposite to that shown in FIGS. 5A and 5B. As illustrated in FIGS. 6A and 6B, the retractor frame 50, which is fixed to the vehicle seat back 22, is in a orientation inclined from the vertical direction 382. The inertia members 222 and 224, which are supported for pivotal movement on the gimbal axis 260 which is parallel to the seat back adjustment axis 30, remain in their single predetermined orientation relative to the vertical direction 382. The sensor lever 230 is in a different position relative to the pilot pawl 200 than the positions shown in FIGS. 3A and 5A.

When the vehicle 12 is moving forward at a steady speed in the direction 380 (FIGS. 6A and 6B), the inertia members 222 and 224 move in the direction 380 also. In the event of sudden vehicle deceleration such as occurs in a vehicle collision, the inertia members 222 and 224, as well as the sensor lever 230, continue to move forward relative to the other parts of the retractor 10 which are decelerating. The second inertia member 224, which is supported for pivotal movement about the gimbal axis 260, swings forward and upward, in a direction as illustrated by the arrow 388 in FIG. 6B. The first inertia member 222, which is supported for movement on the second inertia member 224, rolls upward along the ramp surface 282 on the plastic shell 226. The first inertia member 222 exerts an upwardly directed force on the cap portion 340 of the sensor lever 230. The sensor lever 230 pivots upward about the sensor lever axis 320.

The pivoting sensor lever 230 exerts an upwardly directed force on the pilot pawl 200. The pilot pawl 200 pivots about the pilot pawl axis 206. The tooth 212 of the pilot pawl 200 moves into the path of the pilot ratchet teeth 140 which are moving in an arcuate path as the pilot ratchet 130 rotates with the spool 110 about the spool axis 62. The pilot pawl tooth 212 is engaged by one of the ratchet teeth 140 of the pilot ratchet 130. The pilot pawl 200 transmits the rotational force of the pilot ratchet 130 into the main lock pawl actuator 150. The main lock pawl actuator 150 cams the main lock pawl 180 into engagement with the spool locking ratchet wheels 114 and 116. This engagement blocks rotation of the spool 110 in the belt withdrawal direction 124 and thus restrains forward movement of the vehicle occupant.

FIGS. 7–10 illustrate schematically a retractor 400 including a vehicle deceleration sensing assembly 410 in accordance with a second embodiment of the invention. The retractor 400 includes a frame, a portion of which is illustrated at 402. The frame 402 is fixed, in a manner not shown, to the seat back 22.

Figure 7:
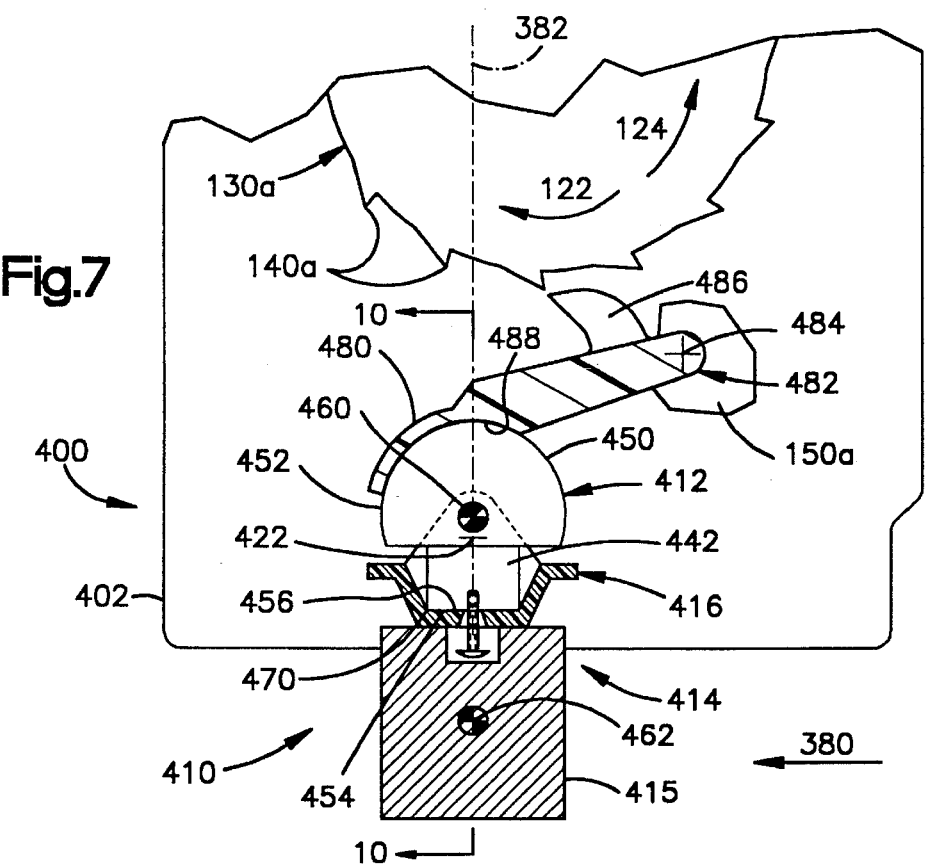
FIG. 7 illustrates schematically a vehicle deceleration sensing assembly for use in a retractor such as the retractor of FIG. 1 and constructed in accordance with a second embodiment of the invention.

The sensing assembly 410 (FIG. 10) includes generally a first inertia member 412, a second inertia member 414, and a pawl 482 (FIG. 7). The first inertia member 412 is a "standing man" inertia mass having an upper portion 450 and a lower portion 442. The upper portion 450 has a spherical outer surface 452. The lower portion 442 has a cylindrical outer surface 444 and a planar lower surface 454 which is circular in configuration. The line of intersection of the circular lower surface 454 of the first inertia member 412 with the cylindrical outer surface 444 forms a circular edge 470 (FIGS. 7 and 8) of the first inertia member 412.

The second inertia member 414 includes a metal weight 415 and a support bracket 416. The metal weight 415 is illustrated as having a cylindrical configuration but can have a different configuration. The bracket 416 is a generally U-shaped plastic member having a pair of support pins 418 and 420 received in openings in the retractor frame 402. The support pins 418 and 420 define a gimbal axis 422. The bracket 416 is supported on the retractor frame 402 for pivotal movement about the gimbal axis 422 relative to the retractor frame. A pair of support screws 430 and 432 are screwed through the bracket 416 and into the metal weight 415 and fix the metal weight for pivotal movement with the bracket 416 about the gimbal axis 422. The planar lower surface 454 of the first inertia member 412 is in abutting engagement with an upwardly facing planar support surface 456 on the bracket 416.

The head portion 434 of a retainer screw 436 is received in a clearance recess 438 in an upper portion of the metal weight 415. A shank portion 440 of the retainer screw 436 extends through a clearance opening 446 in the bracket 416 and is screwed into the cylindrical lower portion 442 of the first inertia member 412. The head portion 434 of the retainer screw 436 is spaced apart from the bracket 416. The retainer screw 436 enables movement of the first inertia member 412 relative to the second inertia member 414, but prevents the first inertia member from falling out of a conical cavity defined by the bracket 416.

The pawl 482 is supported on an actuator member 150a on the retractor frame 402 for pivotal movement about a pawl axis 484 relative to the retractor frame. The pawl axis 484 is fixed in position relative to the gimbal axis 422. A cap portion 480 of the pawl 482 is disposed above and overlies the first inertia member 412. A spherical surface 488 of the cap portion 480 is in abutting engagement with the spherical outer surface 452 of the first inertia member 412. The pawl 482 is disposed adjacent to a ratchet 130a of the retractor 400. The pawl 482 has a tooth 486 which is engageable with ratchet teeth 140a of the ratchet 130a.

When the vehicle 12 in which the retractor 400 is mounted is moving forward, as indicated by the directional arrow 380 in FIG. 7, the inertia members 412 and 414 are moving forward also. The center of mass 460 of the first inertia member 412 is disposed vertically above the center of mass 462 of the second inertia member 414, and below the pawl 482, along the vertical axis 382. The center of mass 462 of the second inertia member 414 is disposed below the gimbal axis 422 and below the support surface 456, in a vertical plane extending through the gimbal axis. The center of mass 460 of the first inertia member 412 is disposed behind (to the right as viewed in FIGS. 7–8) the forwardmost portion of the circular pivot edge 470. The location of the gimbal axis 422 is not necessarily the same as the center of mass 460 of the first inertia member 412 in FIGS. 7, 8, 9 and 10. As the upward vertical distance between the gimbal axis 422 and the center of mass 460 of the first inertia member 412 increases, the lockup sensitivity also increases.

In the event of sudden vehicle deceleration such as occurs in a vehicle collision, the inertia members 412 and 414 continue to move forward relative to the other parts of the decelerating retractor 400. The second inertia member 414 swings forward and thus upward, in a direction as indicated by the arrow 466 in FIG. 8, relative to the vertical axis 382. Because the first inertia member 412 is supported on the second inertia member 414, the center of mass 460 of the first inertia member 412 moves forward and upward. The first inertia member 412 also tips or pivots forward relative to the second inertia member in a direction 468 opposite to the direction 466. The first inertia member 412 pivots about a portion of the pivot edge 470 which is disposed forward of the gimbal axis 422 and on the support surface 456 of the bracket 416. The first inertia member 412 exerts an upwardly directed force on the cap portion 480 of the pawl 482. Simultaneously, the portion of the support surface 456 of the bracket 416 which is disposed forward of the vertical axis 382 also moves upward as a result of the swinging movement of the second inertia member 414 about the gimbal axis 422. This results in an increased rate of upward movement of the cap portion 480 of the pawl 482.

The pawl 482 pivots about the pawl axis 484. The tooth 486 of the pawl 482 moves upward into the arcuate path of movement of the ratchet teeth 140a which are rotating with the spool (not shown) of the retractor 400. When the pawl 482 is engaged by one of the ratchet teeth 140a, the pawl transmits the rotational force of the ratchet 130a to the actuator member 150a. The actuator member 150a actuates a locking mechanism (such as described above with reference to FIGS. 1–4) to block withdrawal of belt webbing from the retractor 40.

Figure 8:
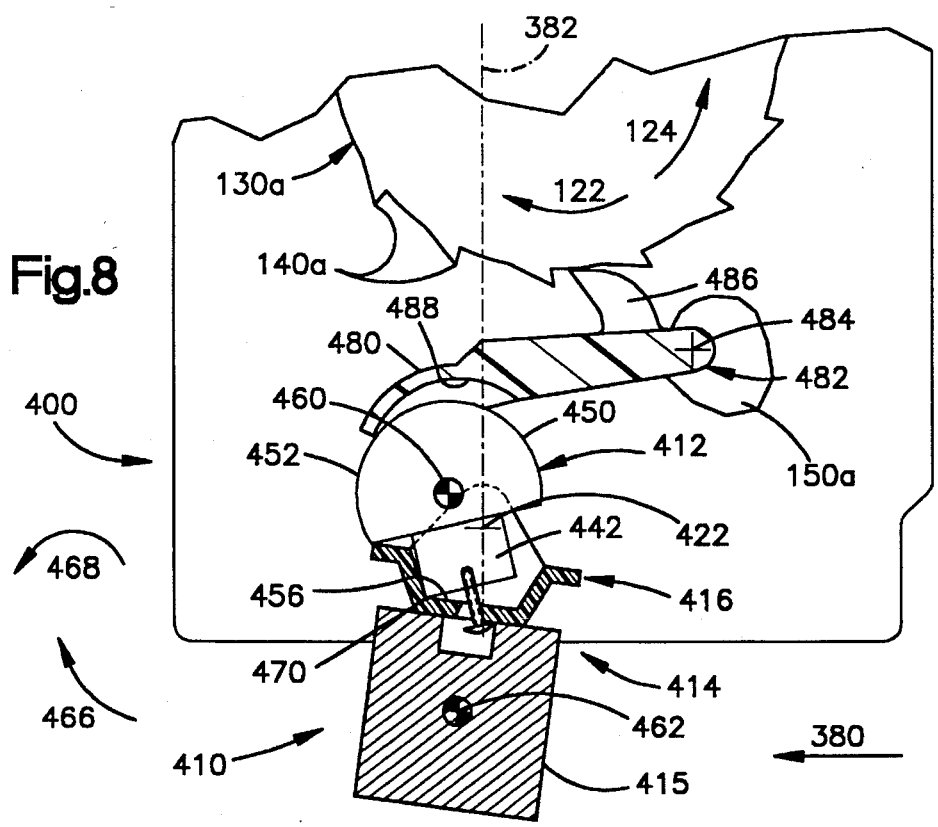
FIG. 8 is a view similar to FIG. 7 showing the sensing assembly of FIG. 7 in an actuated condition.
Figure 9:
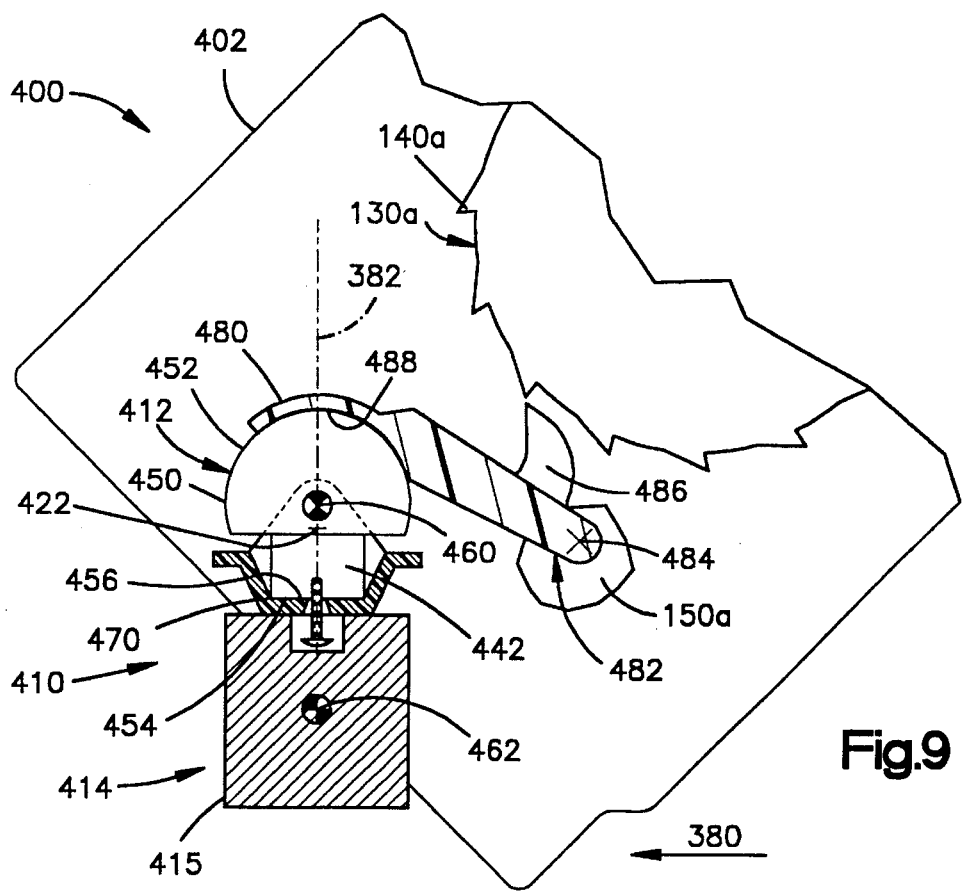
FIG. 9 is a view similar to FIG. 7 showing the sensing assembly of FIG. 7 in a second inclined orientation different from that of FIG. 7.
Figure 10:
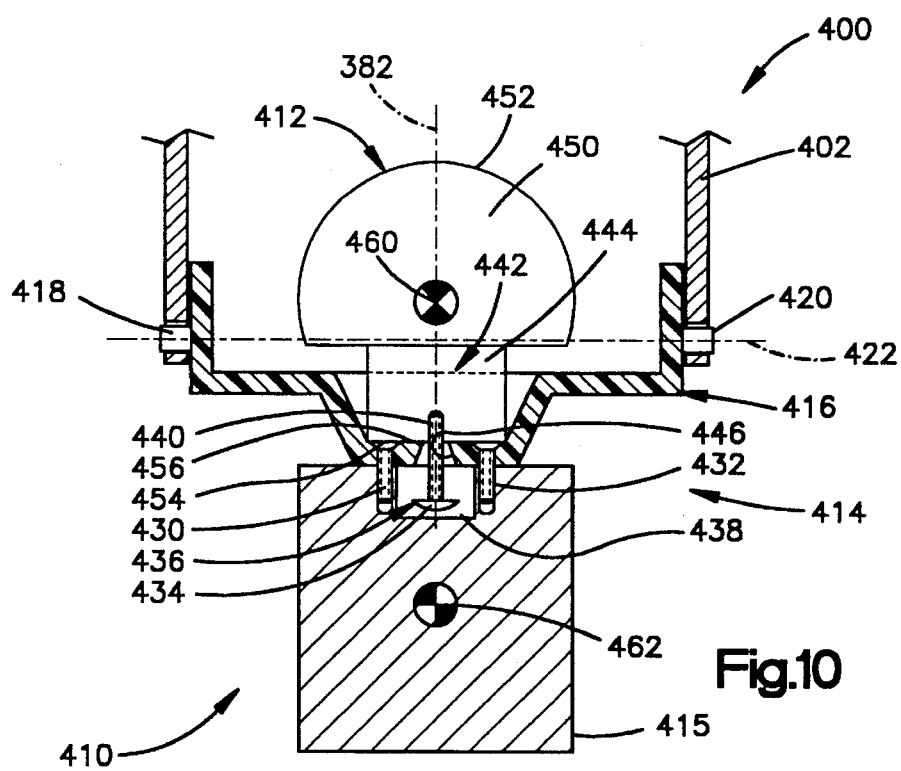
FIG. 10 is a sectional view with parts removed taken along line 10—10 of FIG. 7.

FIG. 9 illustrates the position of parts of the retractor 400 when the retractor is in an inclined orientation different from the inclined orientation shown in FIGS. 7 and 8. In FIG. 9, the retractor frame 402, along with the ratchet 130a, is in a second position or second inclined orientation relative to the vertical direction 382. This can arise, for example, as a result of reclining of the vehicle seat back 22 in which the retractor 400 is mounted.

As can be seen from a comparison of FIGS. 7 and 9, when the retractor frame 402 moves from the orientation shown in FIG. 7 to the inclined orientation shown in FIG. 9, the first inertia member 412 and the second inertia member 414 remain in the same single predetermined orientation relative to the vertical direction 382. The pawl axis 484 and the gimbal axis 422 move with the retractor frame 402 between the different inclined orientations. The spherical surface 488 of the cap portion 480 of the pawl 482 slides along the spherical outer surface 452 of the first inertia member 412, without moving the pawl tooth 486 toward or away from the ratchet 130a. When the retractor 402 is in the second inclined orientation as shown in FIG. 9, the sensing assembly 410 (FIG. 9) is operable in the same manner as described above, with reference to FIGS. 7 and 8, to block the rotation of the ratchet 130a in the direction 124.

From the above description of the invention, those skilled in the art will perceive improvements, changes and modifications in the invention. Such improvements, changes and modifications within the skill of the art are intended to be covered by the appended claims.

Having described the invention, we claim:

1. A seat belt webbing retractor comprising:

a frame;

a spool on which seat belt webbing is wound, said spool being supported on said frame for rotation about a first axis in a belt retraction direction and in an opposite belt withdrawal direction;

means for blocking rotation of said spool in the belt withdrawal direction in response to vehicle deceleration above a predetermined deceleration, said means comprising:

a ratchet rotatable about said first axis;

a pawl supported for pivotal movement about a second axis between a disengaged position and an engaged position in engagement with said ratchet;

a first inertia member movable from an unactuated position to an actuated position in response to vehicle deceleration above a predetermined deceleration;

support means for supporting said first inertia member in said unactuated position when said retractor is in any one of a plurality of different inclined orientations, said support means and said first inertia member having the same predetermined orientation at each of said plurality of different inclined orientations of said retractor, said first inertia member being movable relative to said support means from the unactuated position to the actuated position;

said support means comprising a second inertia member which is supported on said frame for pivotal movement relative to said frame about a third axis to maintain said predetermined orientation of said first inertia member and of said support means at said plurality of different inclined orientations of said retractor; and sensor means for moving said pawl from the disengaged position to the engaged position in response to movement of said first inertia member relative to said second inertia member from the unactuated position to the actuated position;

said second inertia member comprising a plastic shell and a metal weight connected with said plastic shell, said plastic shell having an upper support surface, said first inertia member comprising a metal ball disposed on said upper support surface of said second inertia member.

2. A retractor as set forth in claim 1 further comprising a hanger connected with said frame and having first and second pivot pin openings disposed on said third axis, said plastic shell having first and second pivot pins rotatably received in said pivot pin openings in said hanger.

3. A seat belt webbing retractor comprising:

a frame;

a spool on which seat belt webbing is wound, said spool being supported on said frame for rotation about a first axis in a belt retraction direction and in an opposite belt withdrawal direction;

means for blocking rotation of said spool in the belt withdrawal direction in response to vehicle deceleration above a predetermined deceleration, said means comprising:

a ratchet rotatable about said first axis;

a pawl supported for pivotal movement about a second axis between a disengaged position and an engaged position in engagement with said ratchet;

a first inertia member movable from an unactuated position to an actuated position in response to vehicle deceleration above a predetermined deceleration;

support means for supporting said first inertia member in said unactuated position when said retractor is in any one of a plurality of different inclined orientations, said support means and said first inertia member having the same predetermined orientation at each of said plurality of different inclined orientations of said retractor, said first inertia member being movable relative to said support means from the unactuated position to the actuated position;

said support means comprising a second inertia member which is supported on said frame for pivotal movement relative to said frame about a third axis to maintain said predetermined orientation of said first inertia member and of said support means at said plurality of different inclined orientations of said retractor; and sensor means for moving said pawl from the disengaged position to the engaged position in response to movement of said first inertia member relative to said second inertia member from the unactuated position to the actuated position;

said sensor means comprising a sensor lever having a first end portion supported on said second inertia member for pivotal movement relative to said second inertia member and a second end portion spaced apart from said first end portion, said second end portion having a first surface in engagement with said first inertia member and a second surface in engagement with said pawl;

said second end portion of said sensor lever including said first and second surfaces being disposed above said first inertia member when said support means and said first inertia member are in said predetermined orientation.

4. A retractor as set forth in claim 3 wherein said sensor lever second end portion includes a cap portion in engagement with said first inertia member and an arcuate rib projecting radially outward from said cap portion, said sensor lever first surface being disposed on said cap portion;

said sensor lever second surface comprising an arcuate outer peripheral surface of said arcuate rib having a center on said third axis, said pawl being supported on said arcuate rib surface for sliding movement relative to said sensor lever between a plurality of positions corresponding to said plurality of different inclined orientations of said retractor.

5. A retractor as set forth in claim 3 wherein said pawl is disposed at least partially above said first inertia member when said retractor is in said plurality of different inclined orientations, said pawl being movable in a direction away from said second inertia member into engagement with said ratchet as a result of movement of said first inertia member from the unactuated position to the actuated position.

\* \* \* \* \*